US012807098B2

(12) United States Patent
Rachow et al.

(10) Patent No.: US 12,807,098 B2
(45) Date of Patent: Nov. 24, 2026

(54) INTEGRATED NOZZLE ASSEMBLY FOR SENSOR CLEANING SYSTEM

(71) Applicant: A. RAYMOND ET CIE, Grenoble (FR)

(72) Inventors: Larry Rachow, Lenox, MI (US); James Mell, Chesterfield, MI (US); Mark Beyer, Armada, MI (US); Kunal Javali, Farmington Hills, MI (US)

(73) Assignee: A. RAYMOND ET CIE, Grenoble (FR)

(*) Notice: Subject to any disclaimer, the term of this patent is extended or adjusted under 35 U.S.C. 154(b) by 353 days.

(21) Appl. No.: 18/286,439

(22) PCT Filed: Apr. 14, 2022

(86) PCT No.: PCT/IB2022/053542

§ 371 (c)(1),
(2) Date: Oct. 11, 2023

(87) PCT Pub. No.: WO2022/219587

PCT Pub. Date: Oct. 20, 2022

(65) Prior Publication Data

US 2024/0190390 A1 Jun. 13, 2024

Related U.S. Application Data

(60) Provisional application No. 63/249,116, filed on Sep. 28, 2021, provisional application No. 63/175,080, filed on Apr. 15, 2021.

(51) Int. Cl.

| | |
|---|---|
| ***B60S 1/52*** | (2006.01) |
| ***B05B 1/32*** | (2006.01) |

(Continued)

(52) U.S. Cl.

CPC ................ *B60S 1/52* (2013.01); *B05B 1/323* (2013.01); *G01S 7/4813* (2013.01);

(Continued)

(58) Field of Classification Search

None

See application file for complete search history.

(56) References Cited

U.S. PATENT DOCUMENTS

| | | | |
|---|---|---|---|
| 11,156,485 B1 * | 10/2021 | Krishnan ................ | B60R 11/00 |
| 2017/0036650 A1 | 2/2017 | Hester et al. | |

(Continued)

FOREIGN PATENT DOCUMENTS

| | | | |
|---|---|---|---|
| DE | 102018210057 A1 * | 12/2019 ............ | G03B 17/08 |

OTHER PUBLICATIONS

International Search Report and Written Opinion of the International Searching Authority for PCT/IB2022/053542, dated Jun. 28, 2022, 15 pages.

*Primary Examiner* — Omair Chaudhri

(74) *Attorney, Agent, or Firm* — WARNER NORCROSS + JUDD LLP

(57) ABSTRACT

A bracket assembly for an integrated LIDAR and camera-based sensing system is provided. The bracket assembly can be mounted to a LIDAR sensor and includes a camera housing. The bracket assembly also includes a plurality of liquid spray nozzles and a plurality of air blower ducts. The plurality of liquid spray nozzles discharge a cleaning liquid (e.g., washer fluid) toward the exterior surface of the LIDAR sensor and the camera sensor, and the plurality of air ducts discharge compressed air toward the exterior surface of the LIDAR sensor and the camera sensor. The liquid spray nozzles and the air ducts cooperate to clear foreign matter from the LIDAR sensor and the camera sensor despite being close to the edge of each such sensor.

10 Claims, 14 Drawing Sheets

(51) Int. Cl.
*G01S 7/481* (2006.01)
*G01S 17/931* (2020.01)
*G02B 27/00* (2006.01)
*G01S 7/497* (2006.01)

(52) U.S. Cl.
CPC ........ *G01S 17/931* (2020.01); *G02B 27/0006* (2013.01); *G01S 2007/4977* (2013.01)

(56) References Cited

U.S. PATENT DOCUMENTS

| | | | | |
|---|---|---|---|---|
| 2018/0015908 | A1* | 1/2018 | Rice | B60S 1/56 |
| 2019/0184942 | A1* | 6/2019 | Vaishnav | B60S 1/544 |
| 2019/0278078 | A1* | 9/2019 | Krishnan | G01S 17/88 |
| 2020/0094782 | A1* | 3/2020 | Baldovino | G03B 37/04 |
| 2020/0094783 | A1* | 3/2020 | Dubey | B60S 1/0844 |
| 2020/0180567 | A1* | 6/2020 | Sakai | B60S 1/485 |
| 2020/0393550 | A1* | 12/2020 | Hamilton | G01S 17/931 |
| 2020/0398795 | A1* | 12/2020 | Sykula | G02B 27/0006 |
| 2021/0025983 | A1* | 1/2021 | Patil | G02B 27/0006 |
| 2021/0031732 | A1* | 2/2021 | Alkharabsheh | G02B 1/18 |
| 2021/0061237 | A1* | 3/2021 | Krishnan | G01S 7/4813 |
| 2021/0063093 | A1* | 3/2021 | Tobiassen | G01S 17/88 |
| 2021/0179032 | A1* | 6/2021 | Vitanov | B08B 3/02 |
| 2022/0041139 | A1* | 2/2022 | Surineedi | B60S 1/56 |
| 2022/0066031 | A1* | 3/2022 | Robertson, Jr. | G01S 7/4813 |
| 2022/0132004 | A1* | 4/2022 | Kanitz | B60W 60/001 |
| 2022/0306049 | A1* | 9/2022 | Badanov | B05B 7/0815 |
| 2022/0390568 | A1* | 12/2022 | Kubota | G01S 17/89 |
| 2023/0031726 | A1* | 2/2023 | Kubota | G01S 7/497 |
| 2023/0089733 | A1* | 3/2023 | Avram | G01S 17/86<br>701/28 |
| 2024/0272280 | A1* | 8/2024 | Adams | B08B 5/02 |

* cited by examiner

INTEGRATED NOZZLE ASSEMBLY FOR SENSOR CLEANING SYSTEM

CROSS-REFERENCE TO RELATED APPLICATIONS

This application claims the benefit of U.S. Provisional Application 63/175,080, filed Apr. 15, 2021, and U.S. Provisional Application 63/249,116, filed Sep. 28, 2021, the disclosures of which are hereby incorporated by reference in their entirety.

FIELD OF THE INVENTION

The present invention relates to an integrated nozzle assembly for a sensor cleaning system having a LIDAR sensor and a camera sensor.

BACKGROUND OF THE INVENTION

Autonomous vehicles rely on data from a combination of sensors to navigate the environment around the autonomous vehicle. Two such sensors include Light Detection and Ranging (LIDAR) sensors and camera sensors. LIDAR sensors are more expensive than camera sensors and have a larger physical footprint, however LIDAR sensors require less processing power than camera sensors and have a longer range. Camera sensors, for example CMOS cameras and CCD cameras, are smaller and less expensive than LIDAR sensors, and are able to detect features that LIDAR cannot, for example the color of a stoplight or the words on a sign.

For this reason, automakers are increasingly combining LIDAR sensors with camera sensors into integrated sensor assemblies. However, exposure to the elements can affect the output of LIDAR sensors and camera sensors alike. For example, dirt, snow, ice, and salt can collect on the LIDAR sensor and the camera sensor and can affect how these sensors perceive the exterior environment. Accordingly, it is generally desired to provide a system to periodically remove foreign matter from LIDAR sensors and camera sensors, particularly for integrated LIDAR and camera-based sensing systems for autonomous and semi-autonomous vehicles.

SUMMARY OF THE INVENTION

A bracket assembly for an integrated LIDAR and camera-based sensing system is provided. The bracket assembly can be mounted to a LIDAR sensor and includes a camera housing. The bracket assembly also includes a plurality of liquid spray nozzles and a plurality of air blower ducts. The plurality of liquid spray nozzles discharge a cleaning liquid (e.g., washer fluid) toward the exterior surfaces of the LIDAR sensor and the camera sensor, and the plurality of air ducts discharge compressed air toward the exterior surfaces of the LIDAR sensor and the camera sensor. In this and other embodiments, the bracket assembly provides cleaning of a LIDAR sensor and a camera sensor in an integrated package for easy installation and operation.

In one embodiment, the bracket assembly includes a forward-facing camera aperture for a camera sensor and includes a downward-extending annular skirt which partially surrounds a LIDAR sensor. The annular skirt is spaced apart from the LIDAR sensor to define a small radial gap therebetween. Compressed air is directed downward, through the radial gap toward the LIDAR sensor, and upward, through an air duct toward the camera sensor. The bracket assembly also includes an array of spray nozzles oriented downward toward the LIDAR sensor and includes a camera fluid nozzle oriented downward toward the camera sensor.

In another embodiment, the bracket assembly includes an internal air passage and external fluid lines. The array of spray nozzles are disposed about the periphery of the LIDAR sensor in fluid communication with the external fluid lines. The camera fluid nozzle is also in fluid communication with the external fluid lines and includes an orifice that is oriented towards a lens of the camera sensor. The radial gap and the air duct are in fluid communication with an internal air passage for directing air flow to the LIDAR sensor and the camera sensor.

In another embodiment, the internal air passage can include one or more deflector fins and can include an inline check valve. The bracket assembly optionally includes a cooling port for directing air flow to the rear of the camera sensor. The cooling port protrudes from an upper wall portion of the bracket assembly, the cooling port being in fluid communication with the internal air passage. In operation, the majority of the air flow moving through the internal air passage impinges the camera lens and the LIDAR sensor, however a small portion of the air flow escapes the internal air passage through the cooling port. This air flow impinges the rear of the camera sensor to prevent overheating of the camera sensor. The cooling port includes a tube-like protrusion, being an integral extension of the bracket assembly and oriented at an angle with respect to the upper wall portion of the bracket assembly. In other embodiments the cooling port can include other geometries to provided the desired cooling of the camera sensor.

In another embodiment, the bracket assembly includes an upper air duct housing and a lower air duct housing. The upper air duct housing includes first and second side-walls that are spaced apart from each other and that are joined to a curved end-wall. The curved end-wall includes a downward-extending annular skirt which partially surrounds a LIDAR sensor, the annular skirt being spaced apart from the LIDAR sensor to define a small radial gap therebetween. The lower air duct housing is received within the upper air duct housing and includes a centerbody having sloped side surfaces to divert air toward the first and second side-walls of the upper air duct housing. Compressed air is diverted downward toward the LIDAR sensor via the radial gap between the annular skirt and the LIDAR sensor. Simultaneously, compressed air is diverted upwardly through a linear array of air ducts toward the curved exterior surface of a second sensor, for example a camera sensor or a second LIDAR sensor. An array of fluid spray nozzles are spaced apart from each other and discharge a cleaning fluid downward at a shallow angle relative to the curved exterior surface of the LIDAR sensor.

These and other features and advantages of the present invention will become apparent from the accompanying description of the invention, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. In addition, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
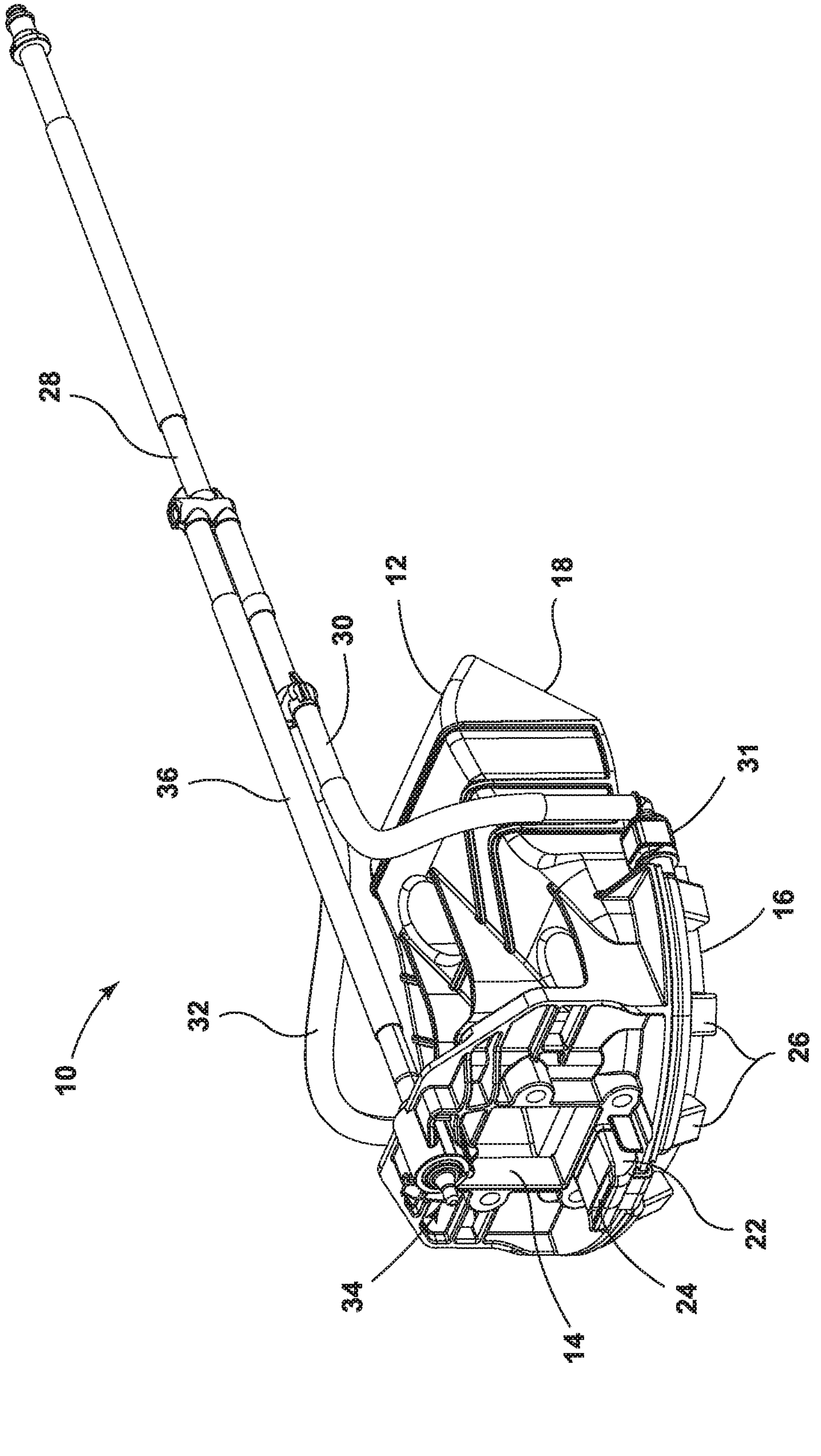
FIG. 1 is a perspective view of a bracket assembly for a sensor cleaning system in accordance with a first embodiment of the invention.
Figure 2:
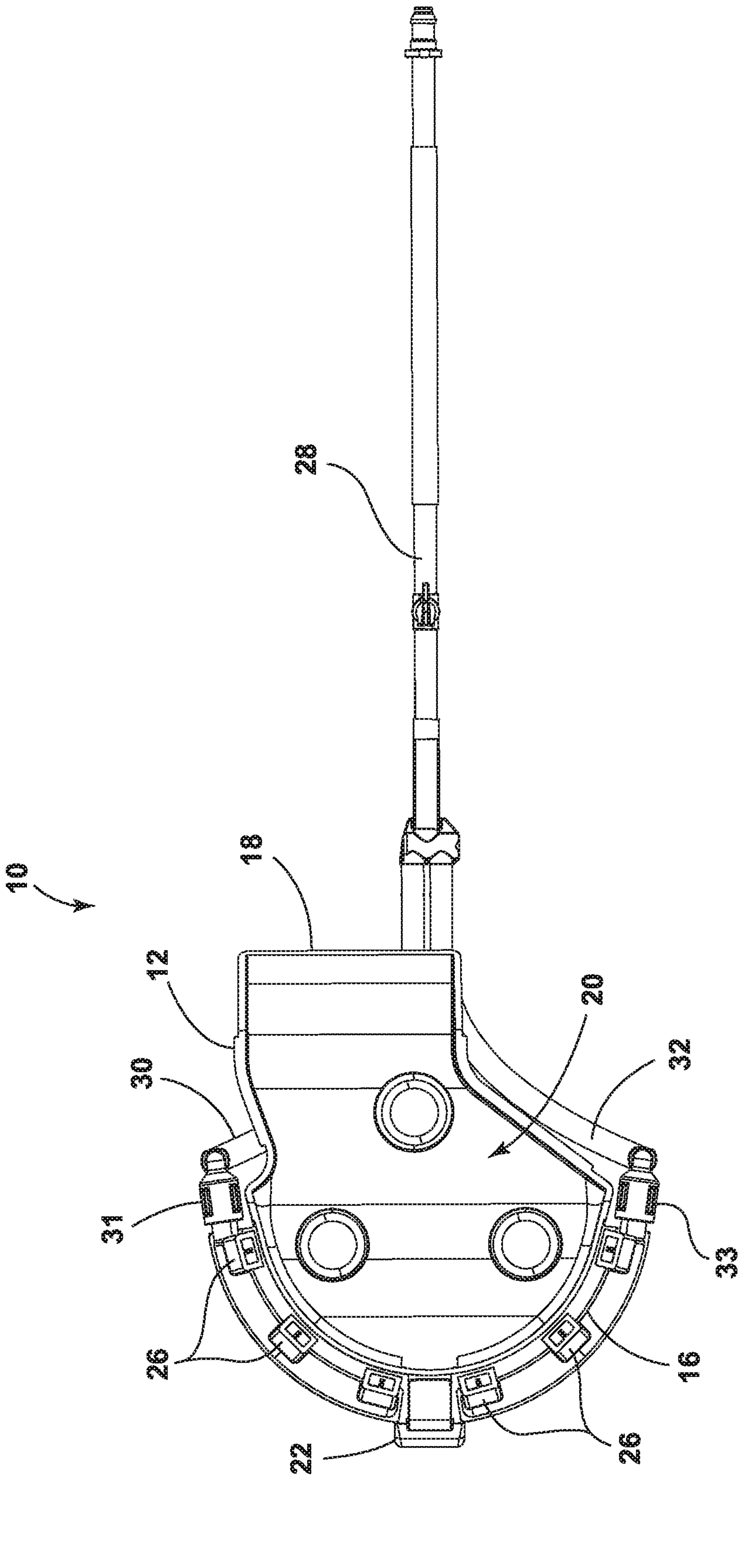
FIG. 2 is a bottom view of the bracket assembly of FIG. 1 illustrating a plurality of fluid spray nozzles for a LIDAR sensor.
Figure 3:
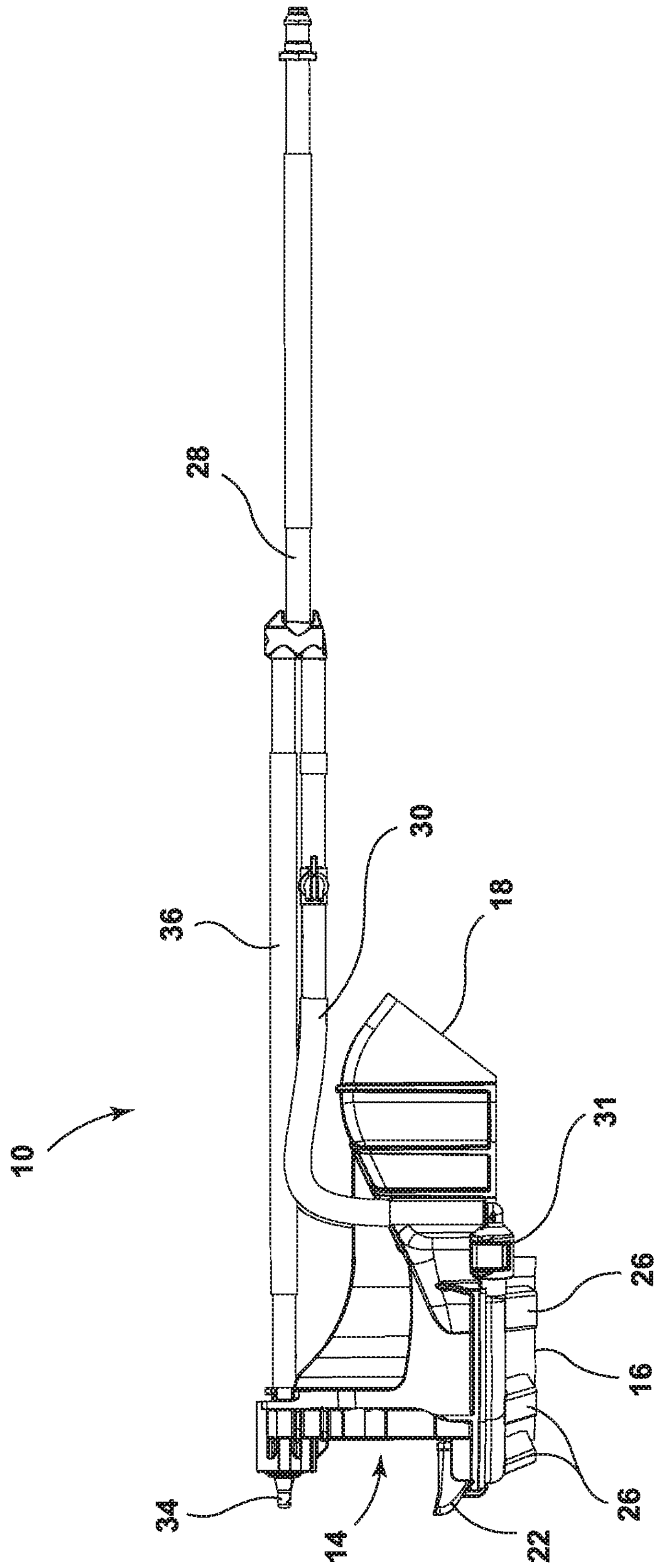
FIG. 3 is a side view of the bracket assembly of FIG. 1 illustrating an air duct and a fluid spray nozzle for a camera sensor.
Figure 4:
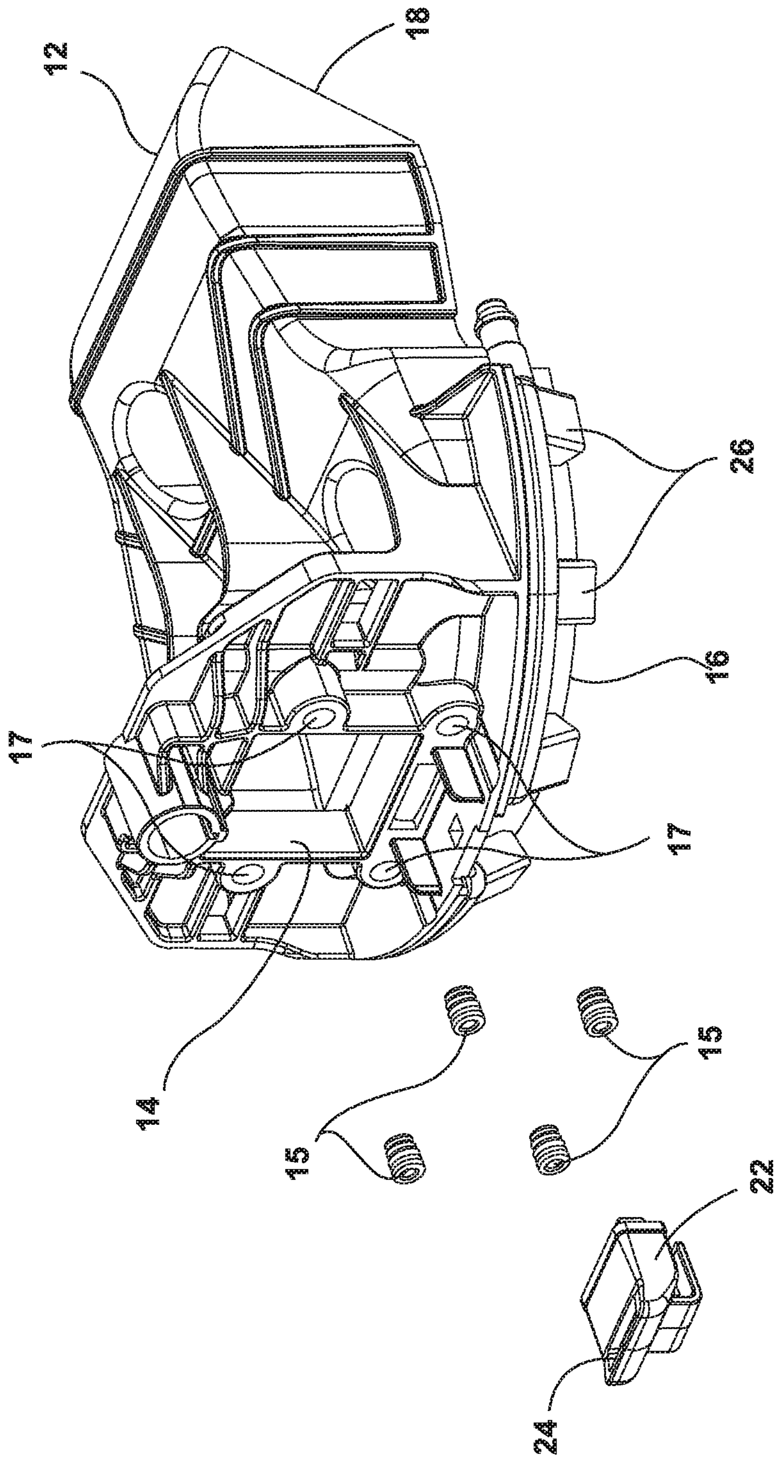
FIG. 4 is an exploded perspective view of a housing structure for the bracket assembly of FIG. 1.
Figure 5:
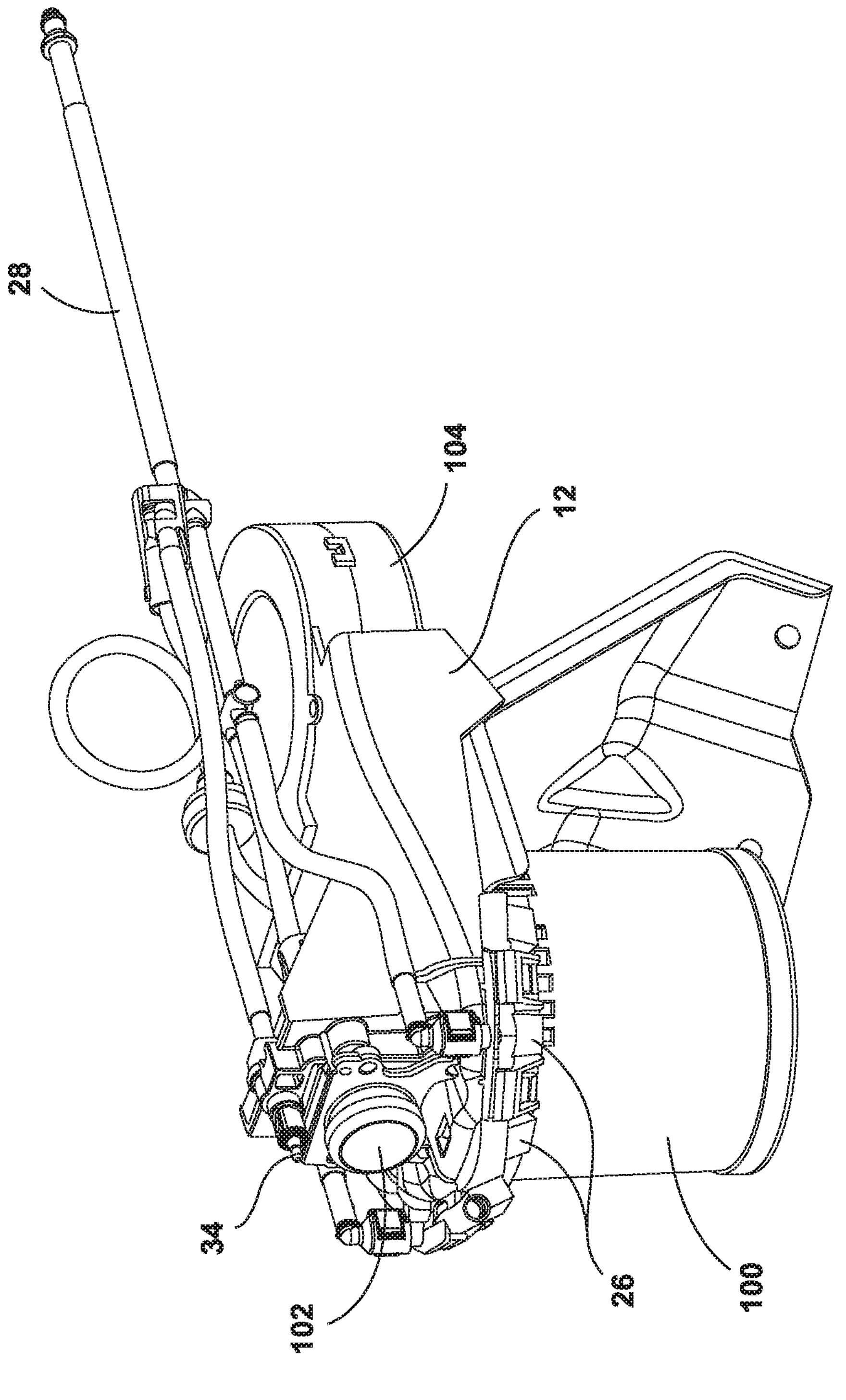
FIG. 5 is a perspective view of the bracket assembly of FIG. 1 including a LIDAR sensor, a camera sensor, and an air blower.
Figure 6:
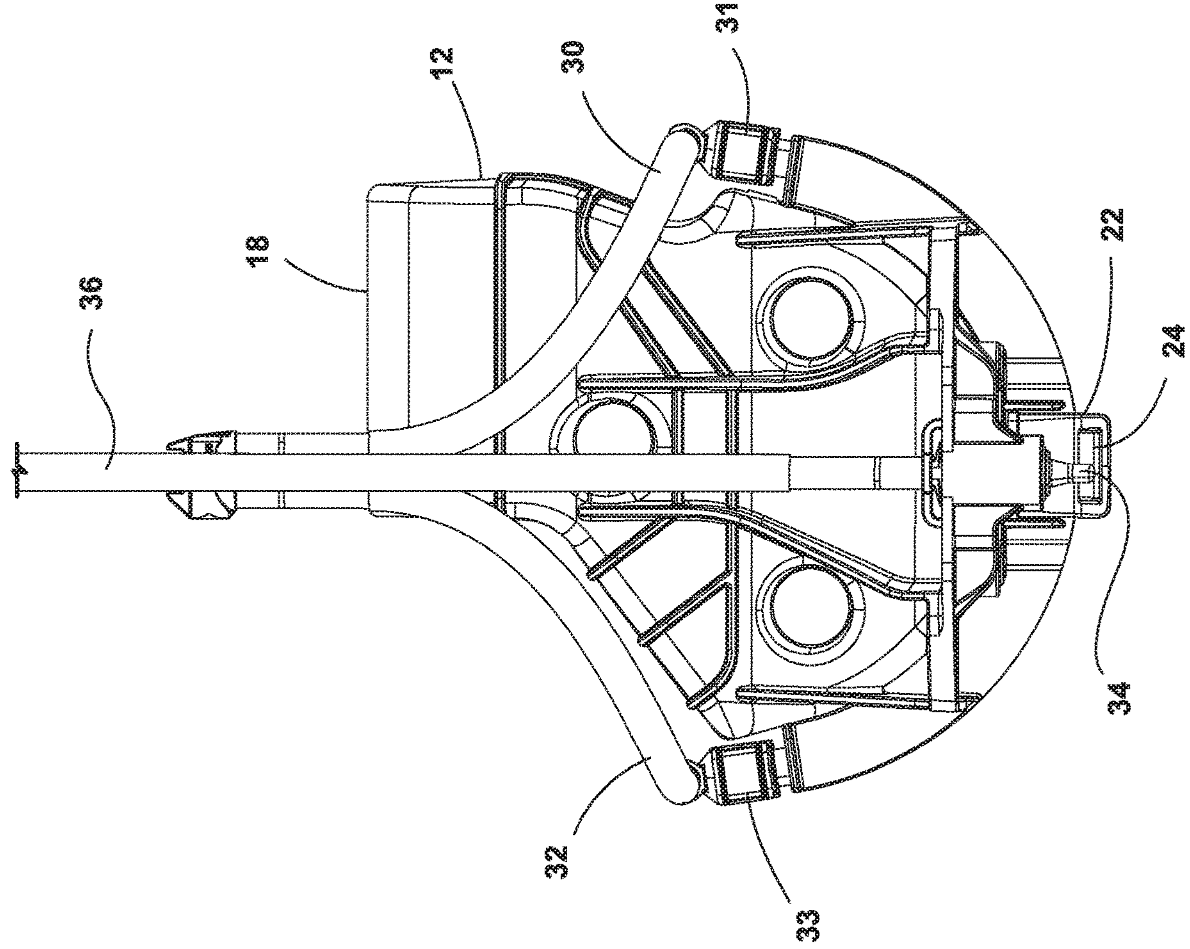
FIG. 6 is a top view of the housing structure of FIG. 4 illustrating an air duct and a fluid spray nozzle for a camera sensor.

As discussed herein, the current embodiments are directed to a bracket assembly for an integrated LIDAR and camera-based sensing system. The bracket assembly can be mounted to a LIDAR sensor and includes a camera housing. The bracket assembly also includes a plurality of liquid spray nozzles and a plurality of air ducts. The liquid spray nozzles and the air ducts cooperate to clear foreign matter from the LIDAR sensor and the camera sensor in an integrated package for easy installation and operation.

Referring first to FIGS. 1-6, a bracket assembly in accordance with a first embodiment is illustrated and generally designated 10. The bracket assembly 10 includes a housing structure 12 joined to an upper portion of a LIDAR sensor 100. The bracket assembly 10 contains a camera aperture 14 for a camera sensor 102 and includes a downward-extending annular skirt 16 which partially surrounds the LIDAR sensor 100, the annular skirt 16 being spaced apart from the LIDAR sensor 100 to define a small radial gap therebetween. The camera aperture 14 comprises a rectangular opening in the illustrated embodiment, but can include other geometries in other embodiments, including a circular opening, for example. A plurality of fasteners 15 secure the camera sensor 102 to the housing structure 12 via fastener openings 17.

The housing structure 12 defines an internal air passage for directing compressed air to both of the LIDAR sensor 100 and the camera sensor 102. In particular, a rearward portion of the housing 12 includes a rectangular opening 18 in fluid communication with a source of compressed air, for example a blower 104. Compressed air passing through the opening 18 enters a central chamber 20 and is diverted downward toward the LIDAR sensor 100 and upward toward the camera sensor 102. In particular, compressed air passes through the radial gap that is defined between the inner diameter of the downward extending annular skirt 16 and the outer diameter of the LIDAR sensor 100. Compressed air also passes upwardly through an air duct 22, which includes a rectangular opening 24 immediately beneath the camera sensor 102.

The air duct 22 directs compressed air along a first transverse (vertical) axis and at a shallow angle relative to the camera sensor 102. As noted above, the bracket assembly 10 also includes a plurality of liquid spray nozzles for cleaning the LIDAR sensor 100. In the illustrated embodiment, the plurality of liquid spray nozzles 26 include six fluid nozzles disposed about the periphery of the annular skirt 16 oriented at an acute angle (less than 90 degrees) relative to the exterior surface of the LIDAR sensor 100 for discharging a cleaning fluid on the LIDAR sensor. Greater or fewer number of nozzles can be used in other embodiments. The plurality of liquid spray nozzles 26 act to clean the LIDAR sensor 100 in concert with the discharge of compressed air toward the LIDAR sensor, sequentially, or a combination of both.

The plurality of liquid spray nozzles 26 are in fluid communication with a primary fluid line 28 via right and left secondary fluid lines 30, 32. Each secondary fluid line 30, 32 is in fluid communication with a subset of the plurality of liquid spray nozzles 26 via first and second check valves 31, 33. The primary fluid line 28 also provides a cleaning fluid to a camera spray nozzle 34 via a tertiary fluid line 36. The camera spray nozzle 34 is positioned immediately above the camera sensor 102, opposite of the air duct opening 24. The camera spray nozzle 34 directs the cleaning fluid along a second transverse axis, opposite of the first transverse axis, at a shallow angle relative to the camera sensor 102, wherein the first transverse axis and the second transverse axis are oriented toward a geometric center of the camera sensor 102. When both the air duct 22 and the fluid nozzle 34 act to clean the camera sensor 102, the air duct 22 and the fluid nozzle 34 may act in concert, sequentially, or a combination of both.

Figure 7:
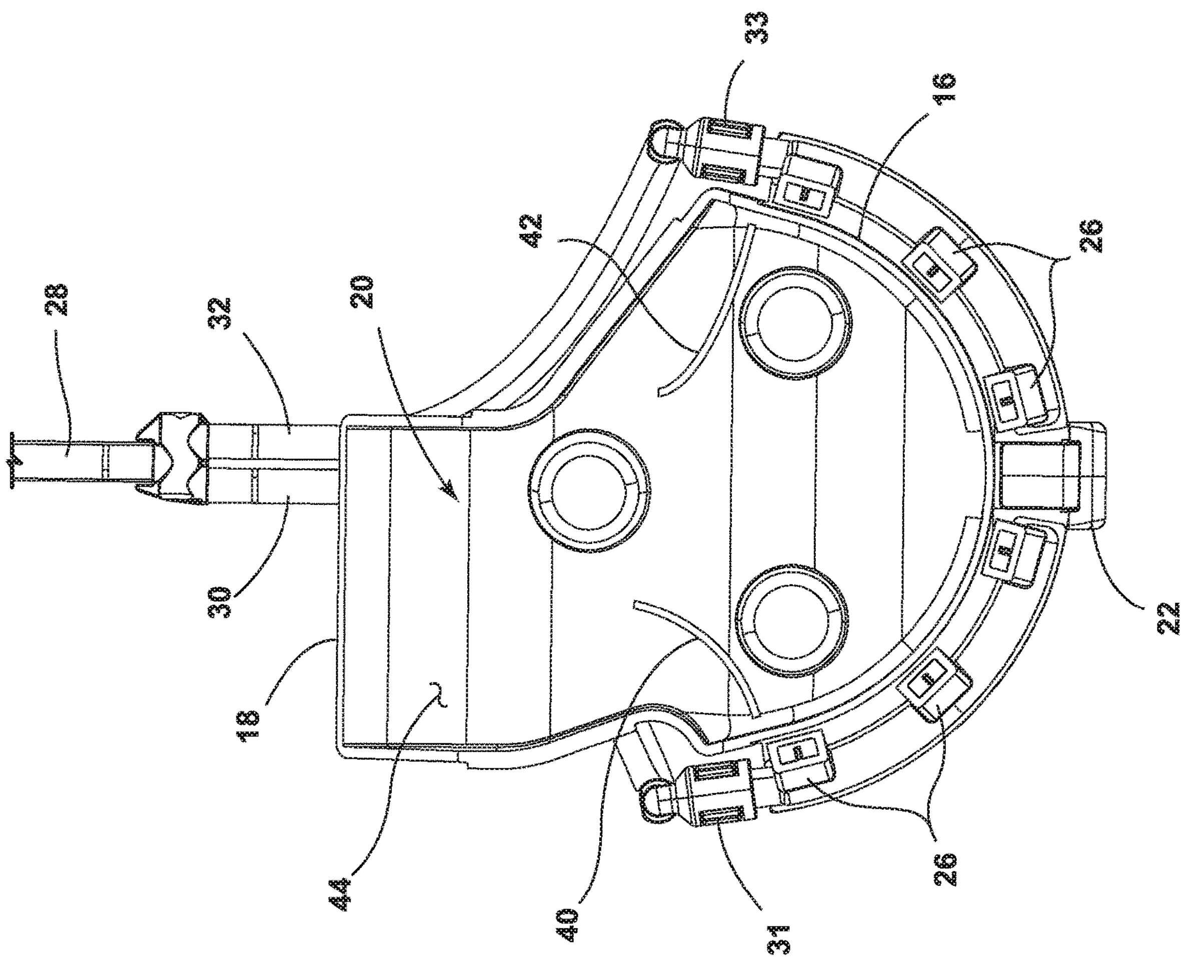
FIG. 7 is a bottom view of the housing structure of FIG. 4 including first and second deflector fins.
Figure 8:
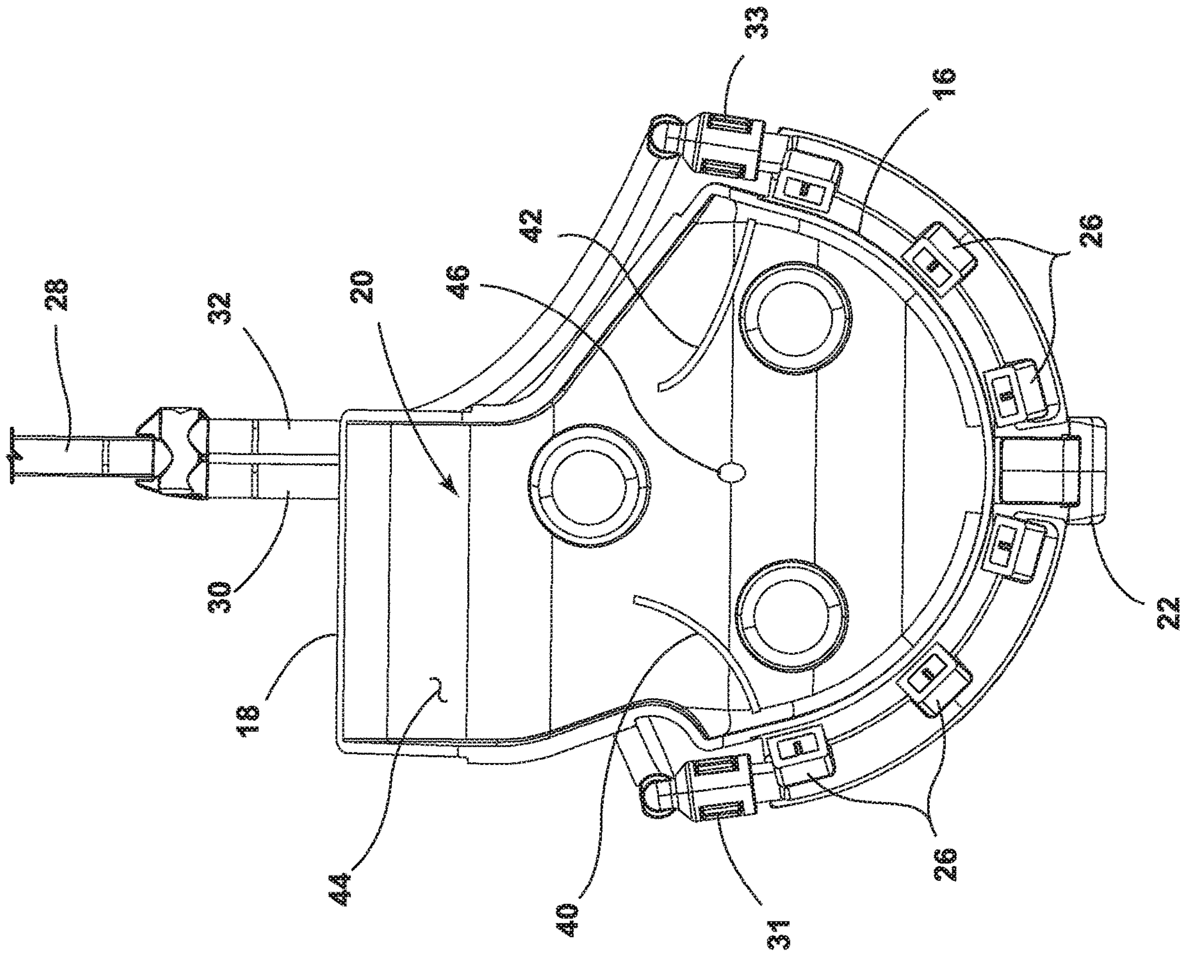
FIG. 8 is a bottom view of a housing structure including a cooling port for directing a cooling fluid over the camera sub-assembly.
Figure 9:
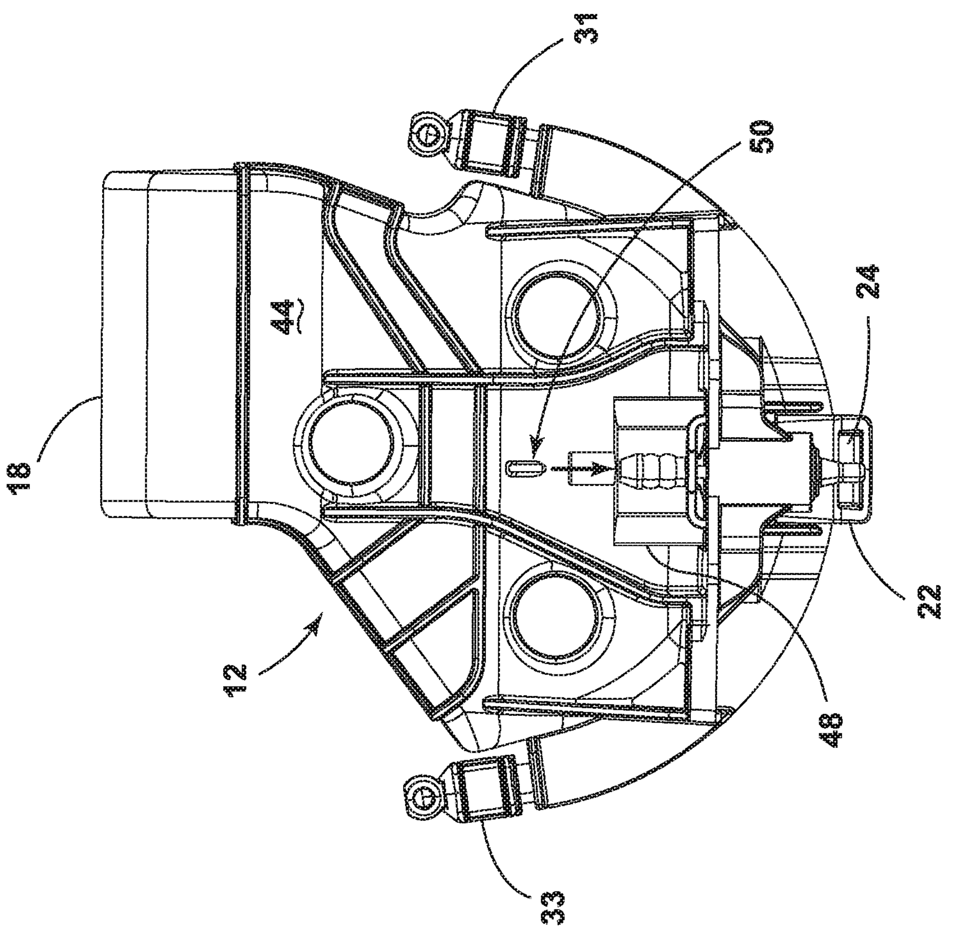
FIG. 9 is a top view of the housing structure of FIG. 8 illustrating a cooling nozzle for directing compressed air toward an internal camera housing.
Figure 10:
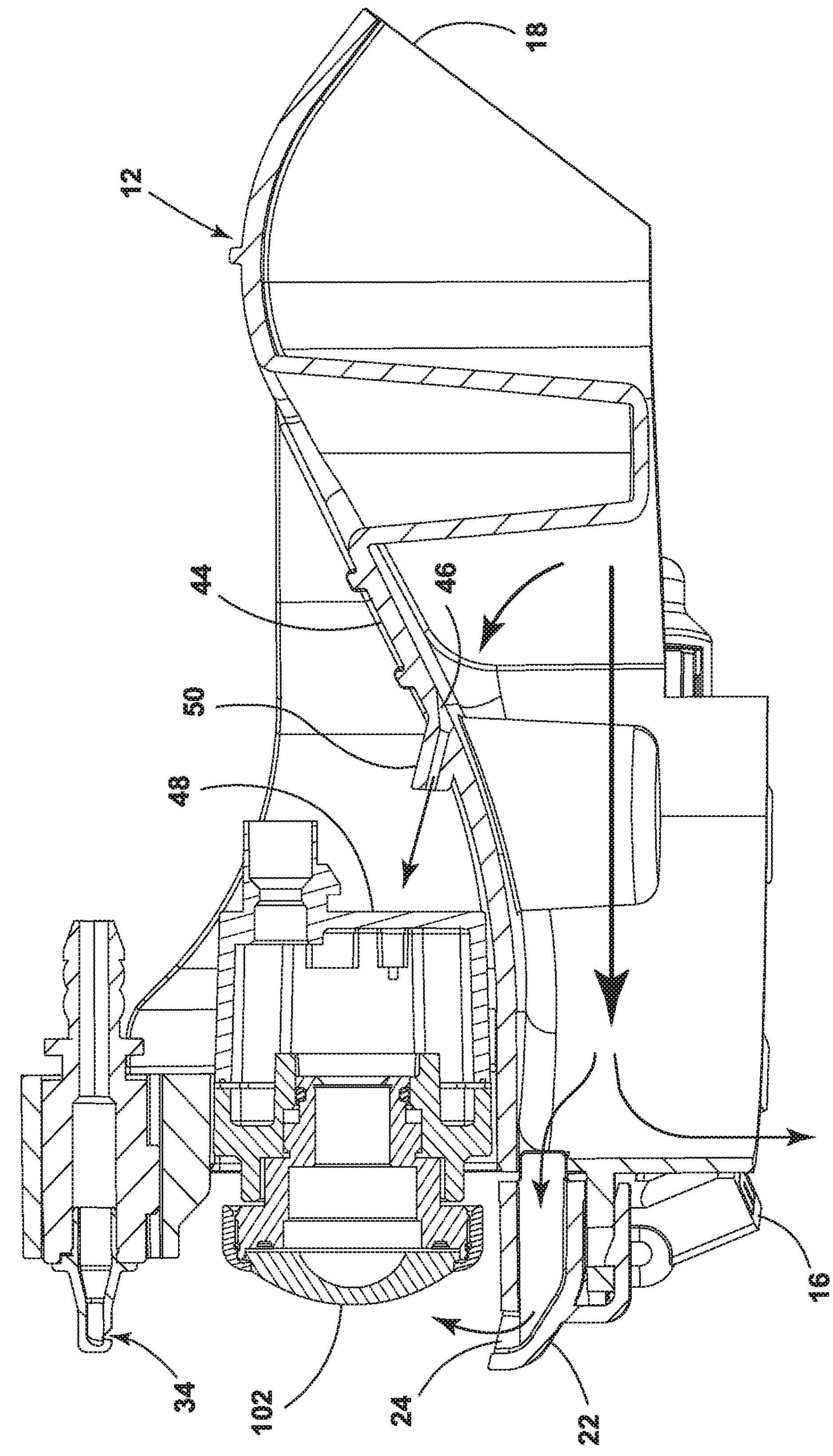
FIG. 10 is a side cross-sectional view of the housing structure of FIG. 8 illustrating a cooling nozzle for directing compressed air toward an internal camera housing.
Figure 11:
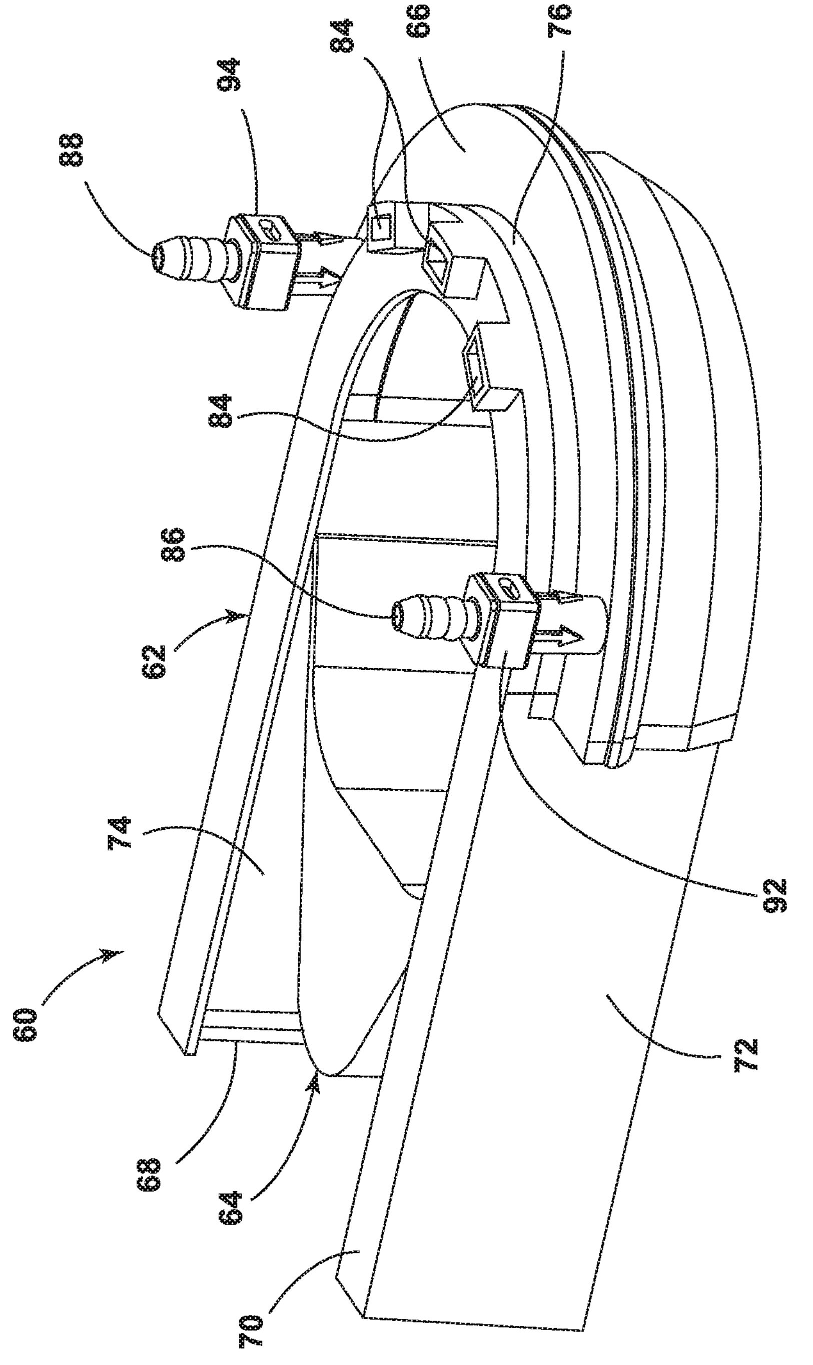
FIG. 11 is a perspective view of a bracket assembly for a sensor cleaning system in accordance with a second embodiment of the invention.
Figure 12:
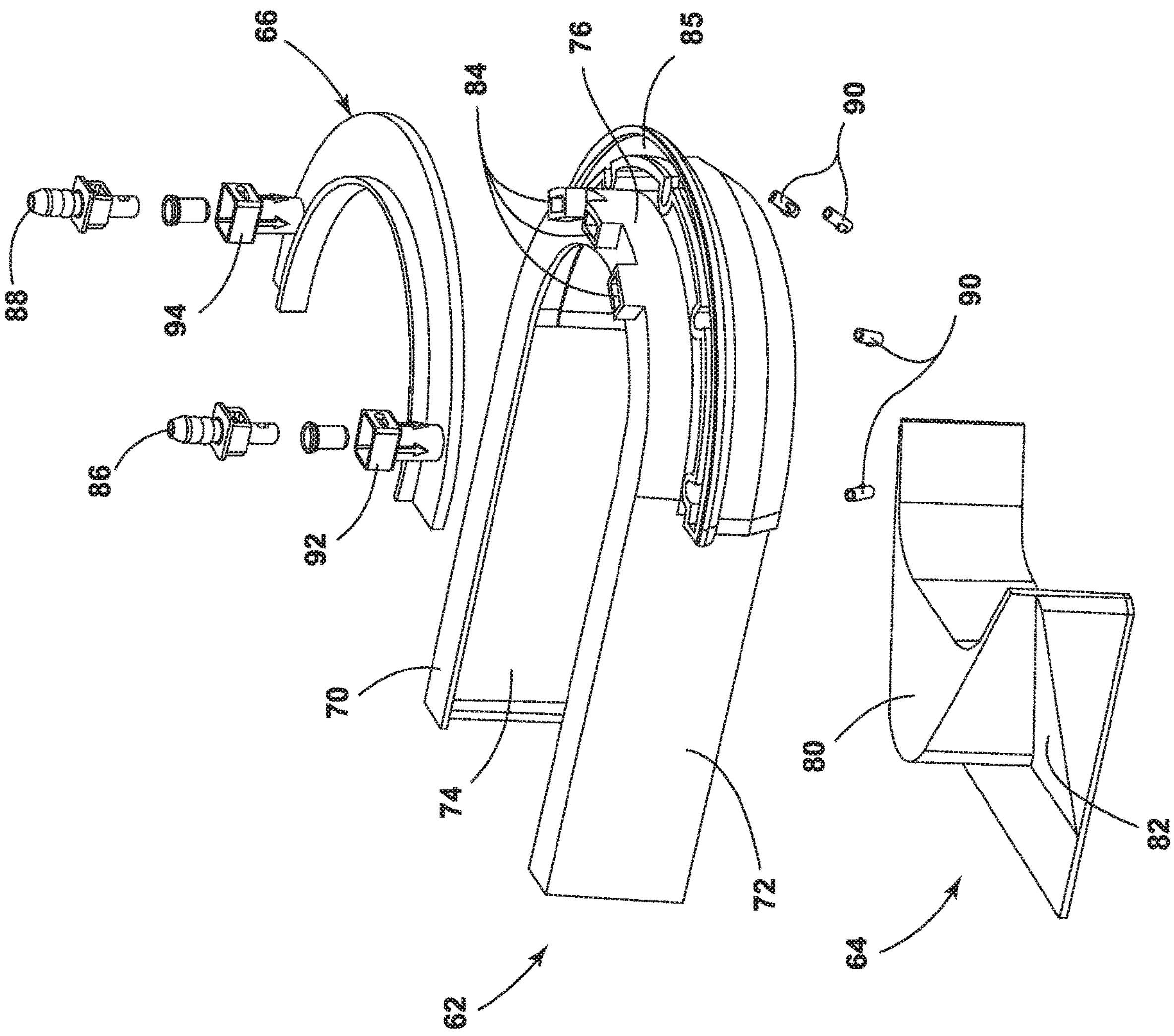
FIG. 12 is an exploded perspective view of the bracket assembly of FIG. 11 illustrating upper and lower air duct housings and a fluid spray nozzle cover.
Figure 13:
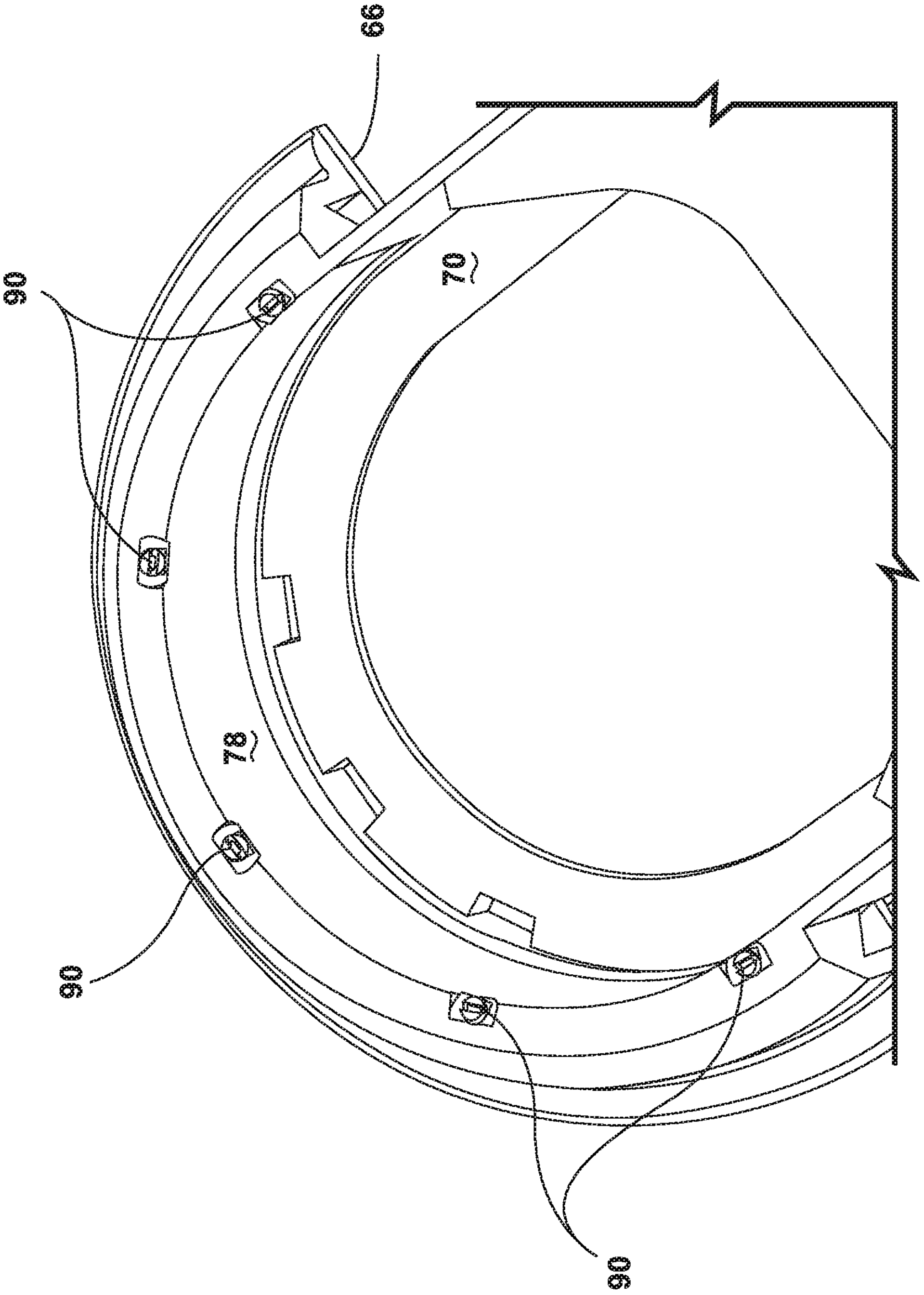
FIG. 13 is an inverted perspective view of the upper air duct nozzle of FIG. 11 illustrating an annular skirt and a plurality of fluid spray nozzles.
Figure 14:
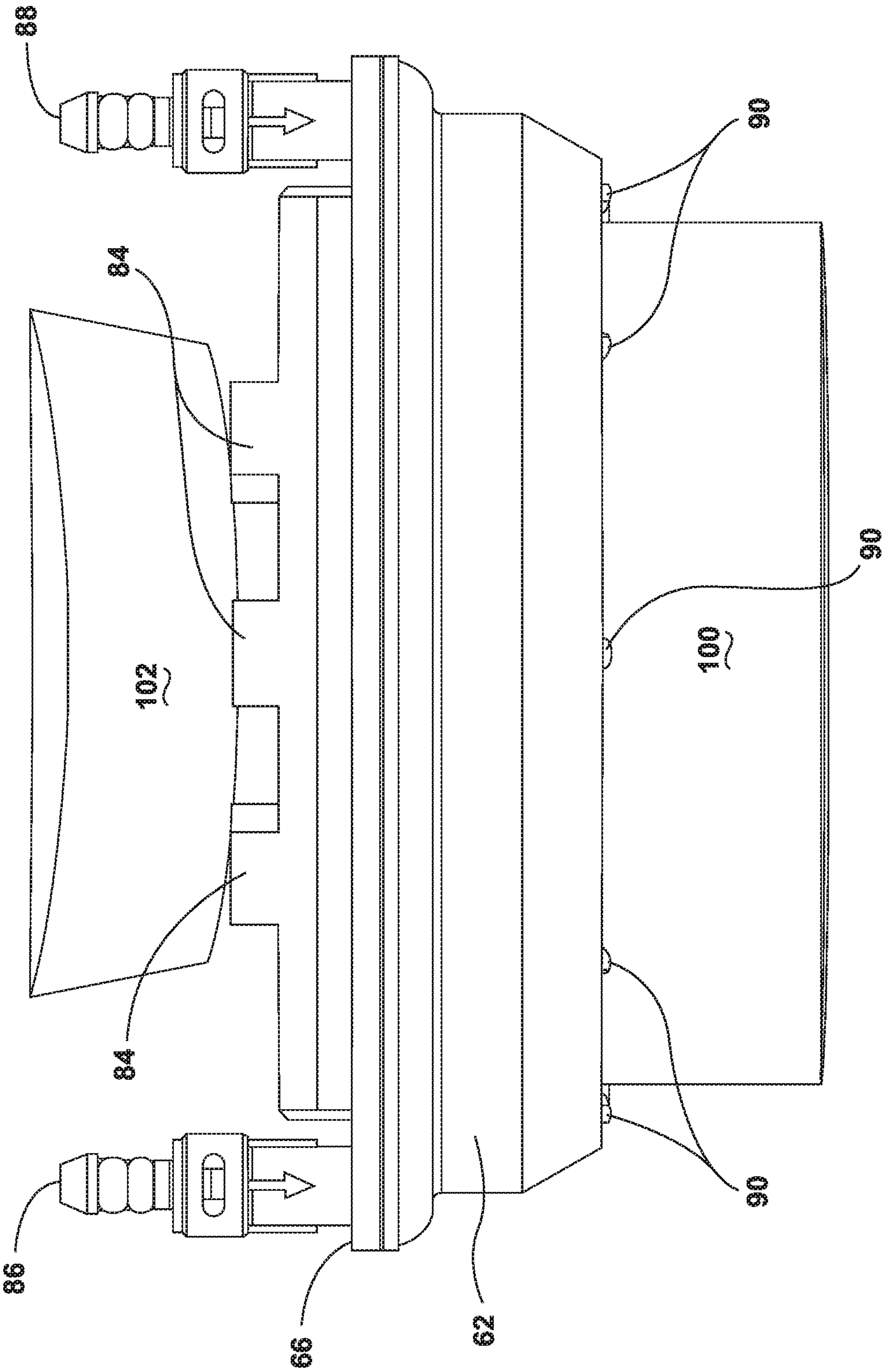
FIG. 14 is a front view of the bracket assembly of FIG. 11 for cleaning upper and lower sensors.

As optionally shown in FIG. 7, the housing 12 can include first and second air deflector fins 40, 42 in the central chamber 20. Each air deflector fin 40, 42 is curved to deflect compressed air outwardly toward the lateral end portions of the annular skirt 16, which spans between 120 degrees and 180 degrees in the illustrated embodiment. As further optionally shown in FIGS. 8-10, the upper wall 44 of the bracket housing 12 can include a cooling port 46 for allowing compressed air to cool the internal camera 102, which is contained in an internal camera housing 48. In particular, the cooling port 46 is in fluid communication with an upwardly-canted cooling nozzle 50 that directs compressed air to the rear of the camera housing 48. The cooling nozzle 50 protrudes from the upper wall 44 of the bracket housing 12, thereby ensuring that the camera sensor 102 does not overheat during prolonged operation.

Referring now to FIGS. 11-14, a bracket assembly in accordance with a second embodiment is illustrated and generally designated 60. The bracket assembly 60 includes an upper air duct housing 62, a lower air duct housing 64, and a fluid spray nozzle cover 64. The upper air duct housing 62 defines a rectangular opening 68 in fluid communication with a source of compressed air, for example a blower. First and second side-walls 72, 74 are spaced apart from each other and are joined to a curved end-wall 76. The curved end-wall 76 spans 180 degrees and includes a downward-extending annular skirt 78 (visible in FIG. 13) which partially surrounds a LIDAR sensor 100, the annular skirt 78 being spaced apart from the LIDAR sensor 100 to define a small radial gap therebetween. A horizontal lip 70 extends along the entirety of the first and second side-walls 72, 74 and the end-wall 76.

The lower air duct housing 64 is shaped to divert the flow of inlet air toward the first and second side-walls 72, 74 and toward the horizontal lip 70 of the upper air duct housing 62. In particular, the lower air duct housing 64 includes a centerbody 80 having sloped side surfaces that angle outwardly toward the first and second side-walls 72, 74 of the upper air duct housing 62. The lower air duct housing 64 also includes a ramped surface 82 that slopes upwardly toward the horizontal lip 70 of the upper air duct housing 62. By reducing the cross-sectional flow area through the bracket assembly 60, the velocity of air increases in order to maintain a constant flow rate of compressed air. The compressed air is diverted downward toward the LIDAR sensor 100 via the radial gap that is defined between the inner diameter of the annular skirt 78 and the outer diameter of the LIDAR sensor 100. Simultaneously, compressed air is diverted upwardly through a linear array of air ducts 84 toward the curved exterior surface of a second sensor, for example a camera sensor 102. The air ducts 84 are spaced apart from each other along the periphery of the horizontal lip 70 and direct the flow of compressed air upwardly at a shallow angle relative to the curved exterior surface of the second sensor 102.

The fluid spray nozzle cover 66 is seated over an internal flow channel 85 for guiding a cleaning fluid from first and second fluid inlets 86, 88 toward fluid spray nozzles 90 within the upper air duct housing 62. The fluid spray nozzles 90 are spaced apart from each other and discharge a cleaning fluid at a shallow angle relative to the curved exterior surface of the LIDAR sensor 100. In some embodiments, including the embodiment shown, the first and second fluid inlets 86, 88 include internal check valves 92, 94. A wide variety of spray patterns can be achieved via the spray nozzles 90, including jets, static fans, and dynamic fans. The spray nozzles 90 can be integrally formed in the upper air duct housing 62 or can be chip inserts for the upper air duct housing 62. Though not shown, the bracket assembly 60 can optionally divert air over and onto the second sensor 102. For example the bracket assembly 60 can include an auxiliary flow path that diverts air from within the upper air duct housing 62 upward, forward, and downward, onto the second sensor 102. In this embodiment, the linear array of air ducts 84 can be omitted, as compressed air is directed toward the second sensor 102 from immediately above the second sensor 102, rather than immediately below the second sensor 102.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Features of various embodiments may be used in combination with features from other embodiments. Directional terms, such as "vertical," "horizontal," "top," "bottom," "front," "rear," "upper," "lower," "inner," "inwardly," "outer," "outwardly," "forward," and "rearward" are used to assist in describing the invention based on the orientation of the embodiments shown in the illustrations. The use of directional terms should not be interpreted to limit the invention to any specific orientation(s). Any reference to claim elements in the singular, for example, using the articles "a," "an," "the," or "said," is not to be construed as limiting the element to the singular.

The invention claimed is:

1. A bracket assembly for a sensor cleaning system, the bracket assembly comprising:

a housing structure for attachment to a LIDAR sensor and a camera sensor, the housing structure including an internal air passage and external fluid lines;

a plurality of fluid nozzles supported by the housing structure and disposed about a periphery of the LIDAR sensor in fluid communication with the external fluid lines;

a camera fluid nozzle supported by the housing structure and including an outlet orifice that is oriented to direct fluid toward a lens of the camera sensor, the camera fluid nozzle being in fluid communication with the external fluid lines; and an air duct in fluid communication with the internal air passage for directing air flow to the lens of the camera sensor;

wherein the housing structure includes a downward extending annular skirt that is spaced apart from the LIDAR sensor to define a radial gap therebetween; and wherein the housing structure includes a plurality of air deflector fins in the internal air passage configured to deflect compressed air outwardly toward lateral portions of the downward extending annular skirt and through the radial gap toward the LIDAR sensor.

2. The bracket assembly of claim 1, wherein the housing structure includes a camera housing for the camera sensor.

3. The bracket assembly of claim 1, wherein the plurality of fluid nozzles each include an orifice that is oriented toward the LIDAR sensor.

4. The bracket assembly of claim 1, wherein the air duct is positioned opposite of the camera fluid nozzle.

5. The bracket assembly of claim 1, wherein the housing structure includes an inline check valve in the internal air passage.

6. The bracket assembly of claim 1, wherein the housing structure includes first and second integrated check valves proximate the plurality of fluid nozzles.

7. The bracket assembly of claim 1, wherein the plurality of fluid nozzles are supported along first and second fluid channels that extend partially around the LIDAR sensor.

8. The bracket assembly of claim 1, wherein the housing structure includes a cooling port for directing air flow towards the camera sensor.

9. The bracket assembly of claim 8, wherein the housing structure includes an upper wall portion and a camera housing, the cooling port being an integral projection of the upper wall portion.

10. The bracket assembly of claim 8, wherein the cooling port is angled towards a rear portion of the camera housing.

* * * * *